United States Patent
Kunugise et al.

(10) Patent No.: US 9,720,209 B2
(45) Date of Patent: Aug. 1, 2017

(54) IMAGING LENS AND IMAGING APPARATUS

(71) Applicant: FUJIFILM Corporation, Tokyo (JP)

(72) Inventors: Takashi Kunugise, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/856,087

(22) Filed: Sep. 16, 2015

(65) Prior Publication Data

US 2016/0085050 A1  Mar. 24, 2016

(30) Foreign Application Priority Data

Sep. 24, 2014 (JP) .................. 2014-193253

(51) Int. Cl.
- *G02B 13/24* (2006.01)
- *G02B 9/64* (2006.01)
- *G02B 15/177* (2006.01)

(52) U.S. Cl.
CPC ............. *G02B 9/64* (2013.01); *G02B 15/177* (2013.01)

(58) Field of Classification Search
CPC ...... G02B 13/04; G02B 13/18; G02B 15/177; G02B 9/64; G02B 13/005; G02B 13/006; G02B 27/0025; G02B 13/0045
USPC ................................ 359/749–753
See application file for complete search history.

(56) References Cited

U.S. PATENT DOCUMENTS

| | | | |
|---|---|---|---|
| 3,975,090 A | 8/1976 | Lawson | |
| 4,025,168 A | 5/1977 | Sugiyama | |
| 6,016,229 A * | 1/2000 | Suzuki | G02B 13/04 359/740 |
| 2012/0194925 A1* | 8/2012 | Teraoka | G02B 13/004 359/773 |

FOREIGN PATENT DOCUMENTS

| | | | |
|---|---|---|---|
| JP | S5083020 A | 7/1975 | |
| JP | S5172432 A | 6/1976 | |
| JP | H1054934 A | 2/1998 | |
| JP | 2006030581 A | 2/2006 | |
| JP | 2006-072188 | 3/2006 | |
| JP | 2006072188 A * | 3/2006 | |
| JP | 2007-226145 | 9/2007 | |
| WO | WO 2013118480 A1 * | 8/2013 | ............ G02B 13/02 |

OTHER PUBLICATIONS

Japanese Office Action dated May 30, 2017; Application No. 2014-193253.

* cited by examiner

Primary Examiner — Stephone B Allen
Assistant Examiner — Rahman Abdur
(74) Attorney, Agent, or Firm — Young & Thompson

(57) ABSTRACT

An imaging lens is constituted essentially by, in order from the object side to the image side, a negative first lens group, a positive second lens group, a stop, and a positive third lens group. The first lens group is constituted essentially by four or fewer lenses, has a positive lens and a negative meniscus lens provided adjacent to each other in this order from the most object side, and further has a negative lens at the most image side. The second lens group is constituted essentially by one single lens. The third lens group is constituted essentially by five or fewer lenses, and has four lenses having refractive powers of different signs adjacent to each other provided in order as lenses most toward the image side. Predetermined conditional formulae are satisfied.

22 Claims, 11 Drawing Sheets

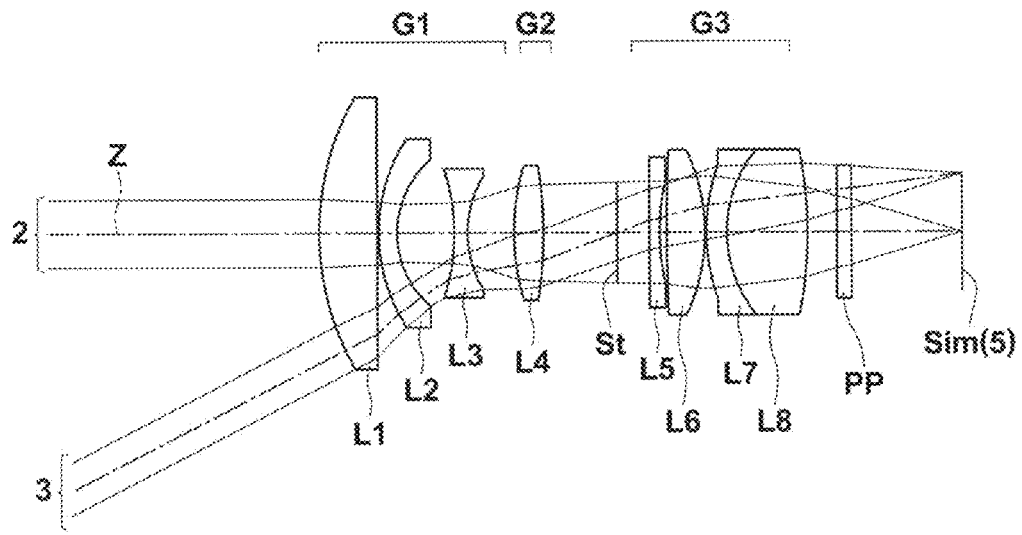
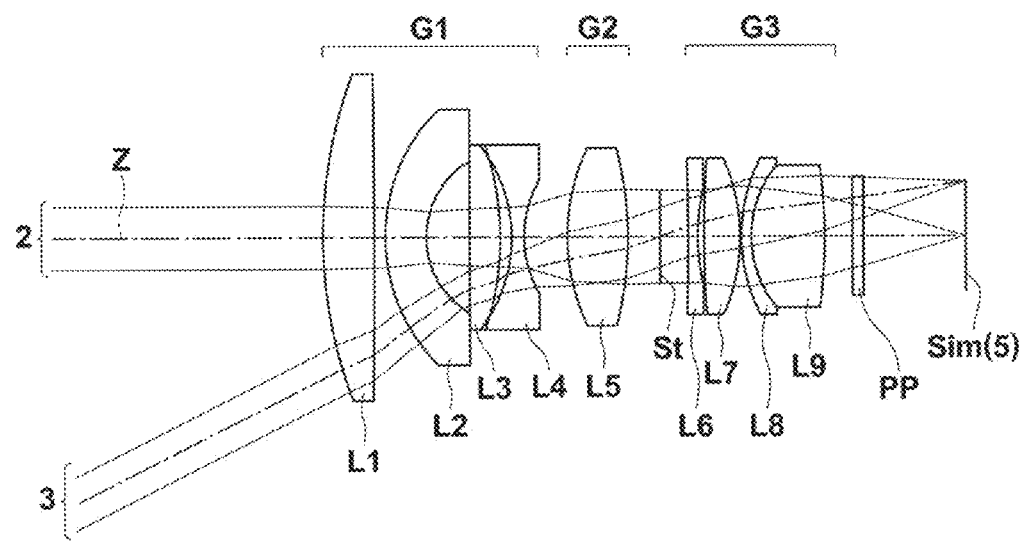

FIG.9 EXAMPLE 3

IMAGING LENS AND IMAGING APPARATUS

CROSS REFERENCE TO RELATED APPLICATIONS

The present application claims priority under 35 U.S.C. §119 to Japanese Patent Application No. 2014-192353 filed on Sep. 24, 2014. The above application is hereby expressly incorporated by reference in its entirety, into the present application.

BACKGROUND

The present disclosure is related to an imaging lens and an imaging apparatus. More specifically, the present disclosure is related to an imaging lens suited for surveillance cameras, industrial cameras, digital cameras, etc., as well as an imaging apparatus equipped with such an imaging lens.

Conventionally, imaging apparatuses in the above fields employ imaging elements such as CCD's (Charge Coupled Devices) and CMOS's (Complementary Metal Oxide Semiconductors). Known lens systems which may be utilized in such imaging apparatuses include those disclosed in Japanese Unexamined Patent Publication Nos. 2006-072188 and 2007-226145. Japanese Unexamined Patent Publication No. 2006-072188 discloses a lens system consisting of, in order from the object side to the image side, a front group having a negative refractive power, a stop, and a rear group having a positive refractive power. Japanese Unexamined Patent Publication No. 2007-226145 discloses a lens system consisting of a front group having a negative refractive power, a rear group having a positive refractive power, and a stop provided within the rear group.

SUMMARY

Meanwhile, the number of pixels in imaging elements is increasing recently, and there is demand for an imaging lens in which various aberrations, particularly chromatic aberrations, are favorably corrected in order to be compatible with such imaging elements. In addition, there is demand for an imaging lens having a small F number for photography in dark places and due to design intentions such as blurring of backgrounds. Further, there is demand for an imaging lens which is configured to be compact, due to circumstances related to installation spaces for imaging apparatuses and portability.

However, it is desirable for the lens system disclosed in Japanese Unexamined Patent Publication No. 2006-072188 to more favorably correct lateral chromatic aberration in order to be compatible with the recent increase in the number of pixels. In addition, the lens system disclosed in Japanese Unexamined Patent Publication No. 2007-226145 has a large F number. If an attempt is made to decrease the F number of the lens system disclosed in Patent Document 2, chromatic aberrations will increase.

The present disclosure has been developed in view of the foregoing points. The present disclosure provides a compact imaging lens with a small F number and high optical performance that corrects various aberrations including chromatic aberrations. The present disclosure also provides an imaging apparatus equipped with such an imaging lens.

An imaging lens of the present disclosure consists essentially of, in order from the object side to the image side:
a first lens group having a negative refractive power;
a second lens group having a positive refractive power;
a stop; and
a third lens group having a positive refractive power;
the first lens group consisting essentially of four or fewer lenses;
the first lens group having a positive lens and a negative meniscus lens provided adjacent to each other in this order as lenses most toward the object side, and further a negative lens as a lens most toward the image side;
the second lens group consisting essentially of one single lens;
the third lens group consisting essentially of five or fewer lenses;
the third lens having four lenses having refractive powers of different signs adjacent to each other provided in order as lenses most toward the image side; and
Conditional Formulae (1) and (2) below being satisfied $$42 < \nu12ave < 60 \quad (1)$$

$$-0.3 < f/f12 < 0.2 \quad (2)$$

wherein ν12ave is the average Abbe's number of all of the lenses within the first lens group and the second lens group with respect to the d line, f is the focal length of the entire lens system, and f12 is the combined focal length of the first lens group and the second lens group.

In the imaging lens of the present disclosure, it is preferable for one or arbitrary combinations of Conditional Formulae (3) through (9) and (1-1) through (6-1) below to be satisfied.

$$1 < Dth12/f < 4.5 \quad (3)$$

$$35 < \nu d2 < 70 \quad (4)$$

$$-2 < f/f1 < -0.75 \quad (5)$$

$$0.15 < Dbw12/f < 1.5 \quad (6)$$

$$0.4 < f/f3 < 1 \quad (7)$$

$$0.2 < f/f2 < 1 \quad (8)$$

$$0.15 < (R3-R4)/(R3+R4) < 0.6 \quad (9)$$

$$46 < \nu12ave < 55 \quad (1\text{-}1)$$

$$-0.2 < f/f12 < 0.15 \quad (2\text{-}1)$$

$$1.5 < Dth12/f < 4 \quad (3\text{-}1)$$

$$40 < \nu d2 < 60 \quad (4\text{-}1)$$

$$-1.5 < f/f1 < -0.8 \quad (5\text{-}1)$$

$$0.21 < Dbw12/f < 1.1 \quad (6\text{-}1)$$

wherein ν12ave is the average Abbe's number of all of the lenses within the first lens group and the second lens group with respect to the d line, f is the focal length of the entire lens system, f12 is the combined focal length of the first lens group and the second lens group, Dth12 is the distance along the optical axis from the surface most toward the object side within the first lens group to the surface most toward the image side within the second lens group, ν2 is the Abbe's number of the negative meniscus lens within the first lens group with respect to the d line, f1 is the focal length of the first lens group, Dbw12 is the air distance along the optical axis between the first lens group and the second lens group, f3 is the focal length of the third lens group, f2 is the focal length of the second lens group, R3 is the radius of curvature of the surface toward the object side of the negative meniscus lens within the first lens group, and R4 is the radius of curvature of the surface toward the image side of the negative meniscus lens within the first lens group.

The first lens group may consist essentially of, in order from the object side to the image side, the positive lens, the negative meniscus lens, and the negative lens. In this case, the imaging lens may be configured such that the air distance along the optical axis between the first lens group and the second lens group is greater than the air distance along the optical axis between the negative meniscus lens within the first lens group and the negative lens within the first lens group.

Alternatively, the first lens group may consist essentially of, in order from the object side to the image side, the positive lens, the negative meniscus lens, a positive lens, and the negative lens.

In addition, the third lens group may consist essentially of, in order to from the object side to the image side, a positive lens, and the aforementioned four lenses. Alternatively, the third lens group may consist essentially of the aforementioned four lenses.

Note that the term "essentially" in the expressions "consist(s) essentially of" and "consisting essentially of" means that the imaging lens of the present disclosure may also include lenses that practically have no power, optical elements other than lenses such as a stop, a cover glass, and filters, and mechanical components such as lens flanges, a lens barrel, a camera shake correcting mechanism, etc., in addition to the constituent elements listed above.

Note that the expression "four lenses . . . adjacent to each other" in the expression "the third lens having four lenses having refractive powers of different signs adjacent to each other" is only related to these four lenses, and does not include a lens which is provided immediately toward the object side of these four lenses.

Note that the signs of the refractive powers and the surface shapes of lenses in the imaging lens of the present disclosure will be considered in the paraxial region for lenses that include aspherical surfaces.

An imaging apparatus of the present disclosure is characterized by being equipped with the imaging lens of the present disclosure.

According to the present disclosure, the number of lenses within the first lens group, the second lens group, and the third lens group are respectively four or less, one, and five or less in a lens system consisting essentially of, in order from the object side to the image side, the negative first lens group, the positive second lens group, the stop, and the positive third lens group. The configurations of each of the lens groups are favorably set, and predetermined conditional formulae are satisfied. Therefore, a compact imaging lens with a small F number and high optical performance that corrects various aberrations including chromatic aberrations can be provided. In addition, an imaging apparatus equipped with this imaging lens can also be provided.

BRIEF DESCRIPTION OF THE DRAWINGS

FIG. 5 is a sectional diagram that illustrates the lens configuration of and the trajectories of light beams through an imaging lens according to Example 5 of the present disclosure.

FIG. 6 is a sectional diagram that illustrates the lens configuration of and the trajectories of light beams through an imaging lens according to Example 6 of the present disclosure.

DETAILED DESCRIPTION OF THE PREFERRED EMBODIMENTS

Figure 1:
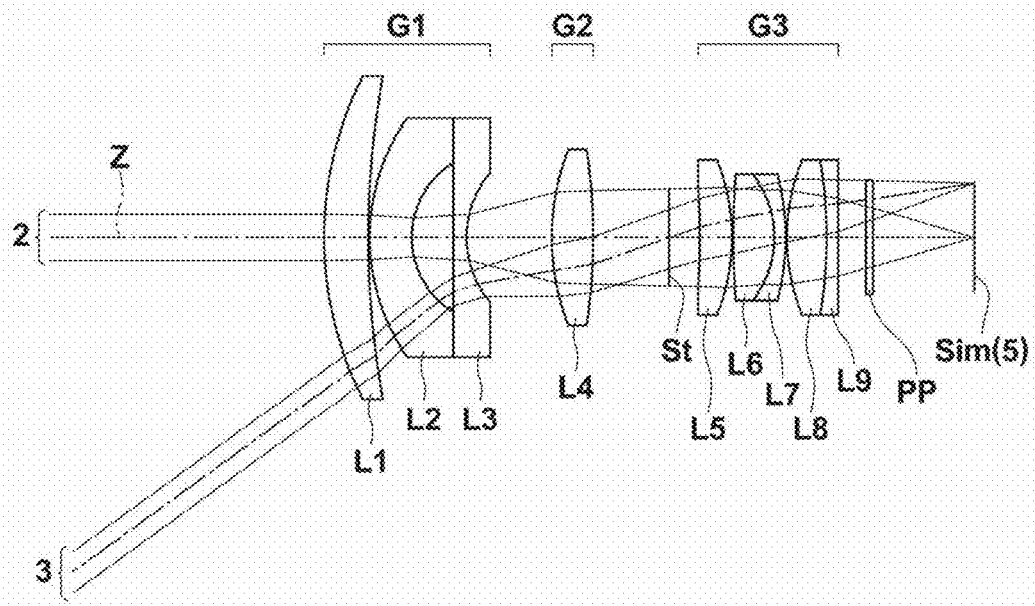
FIG. 1 is a sectional diagram that illustrates the lens configuration of and the trajectories of light beams through an imaging lens according to Example 1 of the present disclosure.

Hereinafter, embodiments of the present disclosure will be described in detail with reference to the accompanying drawings. FIG. 1 is a sectional diagram that illustrates the lens configuration of and the trajectories of light beams through an imaging lens according to an embodiment of the present disclosure. The example illustrated in FIG. 1 corresponds to Example 1 to be described later. In FIG. 1, the left side is the object side, and the right side is the image side.

FIG. 1 also illustrates an axial light beam 4 and an off axis light beam 3 at a maximum image in a state focused on an object at infinity.

The imaging lens is a fixed focus optical system, and consists essentially of, in order from the object side to the image side, a first lens group G1 having a negative refractive power, a second lens group G2 having a positive refractive power, an aperture stop St, and a third lens group G3 having a positive refractive power, provided along an optical axis Z. Note that the aperture stop St illustrated in FIG. 1 does not necessary represent the size or shape thereof, but indicates the position thereof along the optical axis Z.

In the example illustrated in FIG. 1, the first lens group G1 consists of three lenses, which are, in order from the object side to the image side, lenses L1 through L3. The second lens group G2 consists only of a lens L4. The third lens group G3 consists of five lenses, which are lenses L5 through L9.

When this imaging lens is applied to an imaging apparatus, it is preferable for a cover glass, a prism, and various filters such as an infrared ray cutoff filter and a low pass filter to be provided between the optical system and an imaging surface Sim, depending on the configuration of a camera onto which the lens is mounted. Therefore, FIG. 1 illustrates an example in which a plane parallel plate shaped optical member PP that presumes these components is provided between the lens system and the imaging surface Sim. However, a configuration from which the optical member PP is omitted is also possible in the present disclosure.

In addition, FIG. 1 also illustrates an imaging element 5 provided at the imaging surface Sim of the imaging lens, taking a case in which the imaging lens is applied to an imaging apparatus into consideration. The imaging element 5 is schematically illustrated in FIG. 1. However, the imaging element 5 is provided to match the position of the imaging surface Sim in actuality. The imaging element 5 captures optical images formed by the imaging lens, and converts the optical images into electrical signals. A CCD (Charge Coupled Device) or a CMOS (Complementary Metal Oxide Semiconductor) may be employed as the imaging element 5, for example.

Configuring the first lens group G1 to be a lens group having a negative refractive power enables the angles of principal light rays at peripheral angles of view with respect to the optical axis Z to be decreased, which is advantageous from the viewpoint of widening the angle of view. Configuring the second lens group G2 to be a lens group having a positive refractive power results in a positive lens group being positioned at the object side of the aperture stop St, which enables lateral chromatic aberration and distortion generated by the negative first lens group G1 to be corrected more toward the object side than the aperture stop St. In addition, providing the positive second lens group G2 at a position closest to the third lens group G3 enables positive refractive power to be distributed between the second lens group G2 and the third lens group G3, which results in the amount of spherical aberration which is generated being suppressed. Configuring the third lens group G3, which is constituted by all of the lenses positioned at the image side of the aperture stop St, as a lens group having a positive refractive power enables the incident angles of principal light rays at peripheral angles of view with respect to the imaging surface Sim to be decreased.

The first lens group G1 consists essentially of four or fewer lenses. This configuration is advantageous from the viewpoint of miniaturization. In addition, the first lens group G1 has a positive lens and a negative meniscus lens provided adjacent to each other in this order as lenses most toward the object side, and further a negative lens as a lens most toward the image side. The positive lens provided most toward the object side within the first lens group G1 can correct distortion and lateral chromatic aberration. The negative meniscus lens provided second from the object side within the first lens group G1 can minimize the generation of astigmatism, while decreasing the angles of principal light rays at peripheral angles of view with respect to the optical axis Z, which is advantageous from the viewpoint of widening the angle of view. In addition, the negative lens provided most toward the image side within the first lens group G1 cooperates with the negative meniscus lens to achieve a balance of longitudinal chromatic aberration and lateral chromatic aberration.

The positive lens provided most toward the object side within the first lens group G1 may be a biconvex lens or a positive meniscus lens. The negative lens provided most toward the image side within the first lens group G1 may be a planoconcave lens, or a biconcave lens.

The first lens group G1 may be of a three lens configuration consisting essentially of a positive lens, a negative meniscus lens, and a negative lens, provided in order from the object side to the image side, as in the example illustrated in FIG. 1. In this case, miniaturization can be achieved with a smaller number of lenses, and cost can be suppressed.

In the case that the first lens group G1 is of the three lens configuration described above, the imaging lens may be configures such that the air distance along the optical axis between the first lens group G1 and the second lens group G2 is greater than the air distance along the optical axis between the negative meniscus lens within the first lens group G1 and the negative lens within the first lens group G1. This configuration is advantageous from the viewpoints of widening the angle of view and securing back focus.

Alternatively, the first lens group G1 may be of a four lens configuration consisting essentially of, in order from the object side to the image side, a positive lens, a negative meniscus lens, a positive lens, and a negative lens. In this case, the second positive lens from the object side cooperates with the positive lens most toward the object side, to achieve a balance of longitudinal chromatic aberration and lateral chromatic aberration.

The second lens group G2 consists essentially of one single lens. The negative refractive power of the first lens group G1 causes barrel distortion to be generated. Therefore, it is preferable for the positive refractive power of the second lens group G2 to generate pincushion distortion to cancel out the barrel distortion. Here, assuming that the second lens group G2 is constituted by a plurality of lenses, the absolute value of the radius of curvature of each of the plurality of lenses will increase, and the amount of pincushion distortion generated by the second lens group G2 will decrease. As a result, the distortion correcting performance will deteriorate. Accordingly, it is more effective to configure the second lens group G2 to consist of one single lens as opposed to a plurality of lenses from the viewpoint of correcting distortion. The second lens group G2 may be configured by a biconvex lens, for example.

The third lens group G3 consists essentially of five or fewer lenses. This configuration is advantageous from the viewpoint of miniaturization. In addition, the third lens group G3 is configured such that four adjacent lenses having refractive powers of different signs are provided in order as lenses most toward the image side. That is, the first through fourth lenses from the image side within the third lens group G3 are two positive lenses and two negative lenses. These lenses are arranged in order from the image side to the object side as a positive lens, a negative lens, a positive lens, and a negative lens, or arranged in order from the image side to the object side as a negative lens, a positive lens, a negative lens, and a positive lens. This configuration enables positive refractive power and negative refractive power to be distributed among a plurality of lenses, and enables both positive and negative lenses to be provided at the image side at which the heights of peripheral light rays are high. In addition, adjacent lenses can correct various aberrations generated by one another. Therefore, the generation of higher order aberrations can be suppressed.

The aforementioned four lenses within the third lens group G3 may be two pairs of cemented lenses, or two single lenses and one pair of cemented lenses. Among the aforementioned four lenses within the third lens group G3, the first and second lenses from the image side may be cemented together. This configuration is advantageous from the viewpoint of correcting lateral chromatic aberration.

The third lens group G3 may be of a four lens configuration consisting essentially of the aforementioned four lenses. In this case, miniaturization can be achieved with a smaller number of lenses, and cost can be suppressed. Alternatively, the third lens group G3 may be of a five lens configuration consisting essentially of, in order from the object side to the image side, a positive lens, and the aforementioned four lenses, as in the example illustrated in FIG. 1. This configuration is advantageous from the viewpoint of suppressing spherical aberration.

In addition, Conditional Formulae (1) and (2) below are satisfied in this imaging lens.

$$42 < v12ave < 60 \quad (1)$$

$$-0.3 < f/f12 < 0.2 \quad (2)$$

wherein v12ave is the average Abbe's number of all of the lenses within the first lens group and the second lens group with respect to the d line, f is the focal length of the entire lens system, and f12 is the combined focal length of the first lens group and the second lens group.

By configuring the imaging lens such that the value of v12ave is not less than or equal to the lower limit defined in Conditional Formula (1), materials having large Abbe's numbers can be employed for both the positive lenses and the negative lenses. As a result, the amount of chromatic aberrations generated by each lens can be suppressed, and therefore differences in lateral chromatic aberration depending on angles of view and differences in spherical aberration depending on wavelengths become unlikely to occur. By configuring the imaging lens such that the value of v12ave is not greater than or equal to the upper limit defined in Conditional Formula (1), materials having comparatively high refractive indices can be selected. As a result, increases in spherical aberration and distortion can be prevented.

By configuring the imaging lens such that the value of f/f12 is not less than or equal to the lower limit defined in Conditional Formula (2), an increase in the total length of the lens system can be prevented. By configuring the imaging lens such that the value of f/f12 is not greater than or equal to the upper limit defined in Conditional Formula (2), the combined refractive power of the first lens group G1 and the second lens group G2 can be prevented from becoming a large positive value. As a result, the third lens group G3 may have a large positive refractive power, and the incident angles of principal rays of light at peripheral angles of view with respect to the imaging surface Sim can be decreased.

In this imaging lens, it is preferable for one or arbitrary combinations of Conditional Formulae (3) through (9) below to be satisfied.

$$1 < Dth12/f < 4.5 \quad (3)$$

$$35 < vd2 < 70 \quad (4)$$

$$-2 < f/f1 < -0.75 \quad (5)$$

$$0.15 < Dbw12/f < 1.5 \quad (6)$$

$$0.4 < f/f3 < 1 \quad (7)$$

$$0.2 < f/f2 < 1 \quad (8)$$

$$0.15 < (R3-R4)/(R3+R4) < 0.6 \quad (9)$$

wherein f is the focal length of the entire lens system, Dth12 is the distance along the optical axis from the surface most toward the object side within the first lens group to the surface most toward the image side within the second lens group, vd2 is the Abbe's number of the negative meniscus lens within the first lens group with respect to the d line, f1 is the focal length of the first lens group, Dbw12 is the air distance along the optical axis between the first lens group and the second lens group, f3 is the focal length of the third lens group, f2 is the focal length of the second lens group, R3 is the radius of curvature of the surface toward the object side of the negative meniscus lens within the first lens group, and R4 is the radius of curvature of the surface toward the image side of the negative meniscus lens within the first lens group.

By configuring the imaging lens such that the value of Dth12/f is not less than or equal to the lower limit defined in Conditional Formula (3), achieving a balance of longitudinal chromatic aberration and lateral chromatic aberration will be facilitated. By configuring the imaging lens such that the value of Dth12/f is not greater than or equal to the upper limit defined in Conditional Formula (3), an increase in the diameter of the lens most toward the object side can be prevented.

By configuring the imaging lens such that the value of vd2 is not less than or equal to the lower limit defined in Conditional Formula (4), the amount of lateral chromatic aberration which is generated can be suppressed. By configuring the imaging lens such that the value of vd2 is not greater than or equal to the upper limit defined in Conditional Formula (4), excessive correction of lateral chromatic aberration can be prevented.

By configuring the imaging lens such that the value of f/f1 is not less than or equal to the lower limit defined in Conditional Formula (5), the amount of spherical aberration which is generated can be suppressed. Configuring the imaging lens such that the value of f/f1 is not greater than or equal to the upper limit defined in Conditional Formula (5) is advantageous from the viewpoints of securing back focus and widening the angle of view.

Configuring the imaging lens such that the value of Dbw12/f is not less than or equal to the lower limit defined in Conditional Formula (6) is advantageous from the viewpoint of widening the angle of view. By configuring the imaging lens such that the value of Dbw12/f is not greater than or equal to the upper limit defined in Conditional Formula (6), an increase in the diameter of the lens most toward the object side can be prevented.

By configuring the imaging lens such that the value of f/f3 is not less than or equal to the lower limit defined in Conditional Formula (7), the incident angles of principal rays of light at peripheral angles of view with respect to the imaging surface Sim can be decreased. By configuring the imaging lens such that the value of f/f3 is not greater than or equal to the upper limit defined in Conditional Formula (7), the amount of spherical aberration which is generated can be suppressed.

By configuring the imaging lens such that the value of f/f2 is not less than or equal to the lower limit defined in Conditional Formula (8), distortion and lateral chromatic aberration can be favorably corrected. Configuring the imaging lens such that the value of f/f2 is not greater than or equal to the upper limit defined in Conditional Formula (8) is advantageous from the viewpoint of securing back focus.

By configuring the imaging lens such that the value of (R3−R4)/(R3+R4) is not less than or equal to the lower limit defined in Conditional Formula (9), the amount of spherical aberration which is generated can be suppressed. By configuring the imaging lens such that the value of (R3−R4)/(R3+R4) is not greater than or equal to the upper limit defined in Conditional Formula (9), the amount of distortion which is generated can be suppressed.

It is more preferable for Conditional Formulae (1-1) through (9-1) to be satisfied instead of Conditional Formulae (1) through (9), in order to cause the advantageous effects related to each of Conditional Formulae (1) through (9) to become more prominent.

$$46 < \nu 12ave < 55 \tag{1-1}$$

$$-0.2 < f/f12 < 0.15 \tag{2-1}$$

$$1.5 < Dth12/f < 4 \tag{3-1}$$

$$40 < \nu d2 < 60 \tag{4-1}$$

$$-1.5 < f/f1 < -0.8 \tag{5-1}$$

$$0.21 < Dbw12/f < 1.1 \tag{6-1}$$

$$0.45 < f/f3 < 0.9 \tag{7-1}$$

$$0.3 < f/f2 < 0.9 \tag{8-1}$$

$$0.2 < (R3-R4)/(R3+R4) < 0.5 \tag{9-1}$$

It is possible to adopt arbitrary combinations of the preferable configurations and the possible configurations described above. It is preferable for the configurations described above to be selectively adopted as appropriate, according to specifications desired of the imaging lens. It is possible to configure an imaging lens having an F number of 1.9 or less, by adopting the above configurations as appropriate, for example. Next, Examples of numerical values of the imaging lens of the present disclosure will be described.

Example 1

The configuration of the imaging lens of Example 1 is illustrated in FIG. 1. The imaging lens of Example 1 consists of, in order from the object side to the image side, a first lens group G1, a second lens group G2, an aperture stop St, and a third lens group G3. The first lens group G1 consists of three lenses, which are, in order from the object side to the image side, lenses L1 through L3. The second lens group G2 consists only of a lens L4. The third lens group G3 consists of five lenses, which are, in order from the object side to the image side, lenses L5 through L9. All of the lenses that constitute the imaging lens of Example 1 are spherical lenses.

Table 1 shows lens data of the imaging lens of Example 1. Items related to the d line are shown above the frame of Table 1. f is the focal length of the entire lens system, Bf is the back focus as an air converted distance, FNo. is the F number, and 2ω is the maximum angle of view in a state focused on an object at infinity.

In Table 1, ith (i=1, 2, 3, . . . ) surface numbers that sequentially increase from the object side to the image side, with the surface toward the object side of the constituent element at the most object side designated as first, are shown in the column Si. The radii of curvature of ith surfaces are shown in the column Ri, the distances between an ith surface and an i+1 st surface along the optical axis Z are shown in the column Di. Note that the signs of the radii of curvature are positive in cases that the surface shape is convex toward the object side, and negative in cases that the surface shape is convex toward the image side.

The refractive indices of jth (j=1, 2, 3, . . . ) constituent elements that sequentially increase from the object side to the image side, with the constituent element at the most object side designated as first, with respect to the d line (wavelength: 587.6 nm) are shown in the column Ndj. The Abbe's numbers of jth constituent elements with respect to the d line are shown in the column νdj. Note that Table 1 also shows the aperture stop St, the optical member PP, and the imaging surface Sim. In Table 1, a surface number and text reading "(St)" is shown in the row of the surface number of the surface corresponding to the aperture stop, and a surface number and text reading "(IMG)" is shown in the row of the surface number of the surface corresponding to the imaging surface Sim.

In each of the tables shown below, degrees are used as the units for angles and mm are used as the units for lengths. However, it is possible for optical systems to be proportionately enlarged or proportionately reduced and utilized. Therefore, other appropriate units may be used. In addition, numerical values which are rounded off at a predetermined number of digits are shown in each of the tables shown below.

TABLE 1

Example 1
f = 6.058, Bf = 9.761, FNo. = 1.84, 2ω = 70.6°

| Si | Ri | Di | Ndj | νdj |
|---|---|---|---|---|
| 1 | 24.40306 | 3.260 | 1.51680 | 64.20 |
| 2 | 63.05897 | 0.100 | | |
| 3 | 14.60638 | 3.050 | 1.71700 | 47.93 |
| 4 | 6.13344 | 3.020 | | |
| 5 | ∞ | 0.960 | 1.71299 | 53.87 |
| 6 | 7.03931 | 6.190 | | |
| 7 | 17.01929 | 3.000 | 1.79952 | 42.22 |
| 8 | −41.00492 | 5.570 | | |
| 9 (St) | ∞ | 2.210 | | |
| 10 | −56.84401 | 2.340 | 1.52249 | 59.83 |
| 11 | −14.49878 | 0.100 | | |
| 12 | 60.92479 | 2.980 | 1.49700 | 81.54 |
| 13 | −7.13500 | 0.810 | 1.78472 | 25.68 |
| 14 | −17.42915 | 0.100 | | |
| 15 | 14.27050 | 2.880 | 1.71299 | 53.87 |
| 16 | −33.47500 | 0.850 | 1.76182 | 26.52 |
| 17 | ∞ | 2.000 | | |
| 18 | ∞ | 0.500 | 1.51633 | 64.14 |
| 19 | ∞ | 7.503 | | |
| 20 (IMG) | ∞ | | | |

Figure 7:
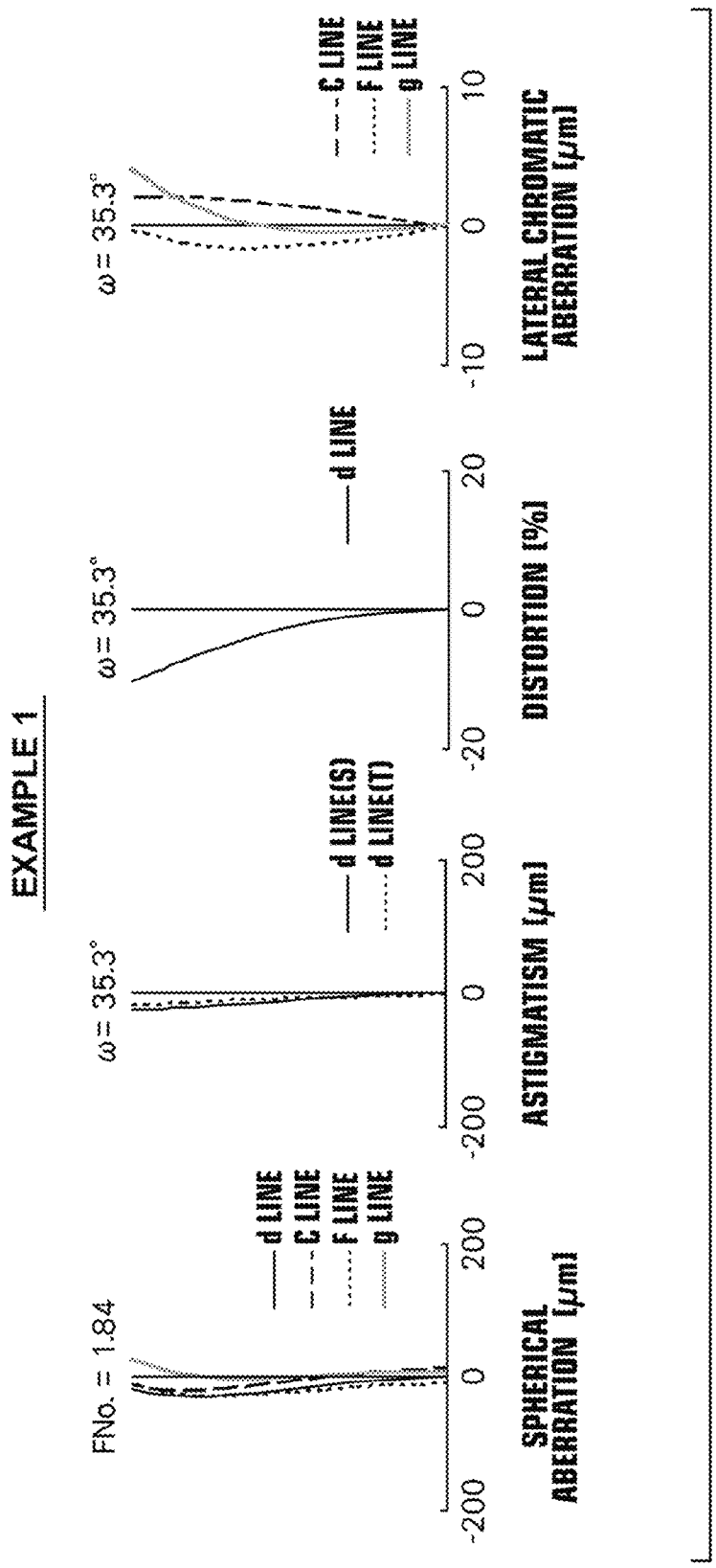
FIG. 7 is a collection of diagrams that illustrate various aberrations of the imaging lens of Example 1, wherein the diagrams are those that illustrate spherical aberration, astigmatism, distortion, and lateral chromatic aberration in order from the left side to the right side of the drawing sheet.

The spherical aberration, the astigmatism, the distortion, the lateral chromatic aberration (chromatic aberration of magnification rates) for a case in which the imaging lens of Example 1 is in a state focused on an object at infinity are illustrated in aberration diagrams in order from the left to the right of FIG. 7. In the diagram that illustrates spherical aberration, aberrations related to the d line (wavelength: 587.6 nm), the C line (wavelength: 656.3 nm), the F line (wavelength: 486.1 nm), and the g line (wavelength: 435.8 nm) are indicated by a solid black line, a long broken line, a short broken line, and a solid gray line, respectively. In the diagram that illustrates astigmatism, aberrations related to the d line in the sagittal direction and the tangential direction are indicated by a solid line and a short broken line, respectively. In the diagram that illustrates distortion, aberration related to the d line is indicated by a solid line. In the diagram that illustrates lateral chromatic aberration, aberrations related to the C line, the F line, and the g line are indicated by a long broken line, a short broken line, and a solid gray line, respectively. In the diagram that illustrates spherical aberration, "FNo." denotes the F number, and in the diagrams that illustrate other aberrations, "ω" denotes the half angle of view.

The methods of illustration in the drawings, symbols, the meanings, and the manners in which the various pieces of data are described in the description of Example 1 above are the same for the examples to be described below unless otherwise noted. Therefore, redundant portions will be omitted from the following descriptions of the other examples.

Example 2

Figure 2:
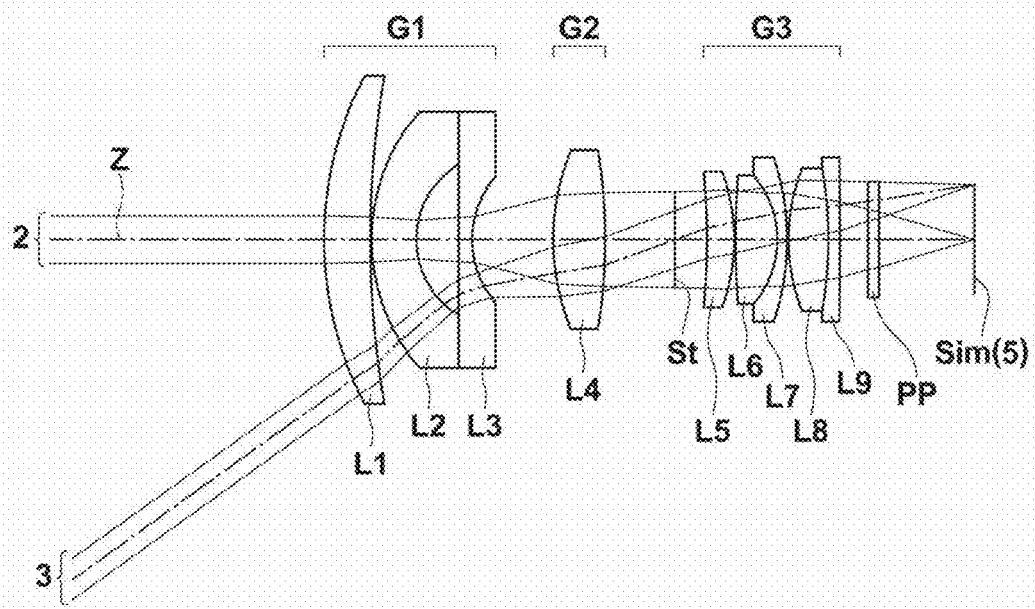
FIG. 2 is a sectional diagram that illustrates the lens configuration of and the trajectories of light beams through an imaging lens according to Example 2 of the present disclosure.
Figure 8:
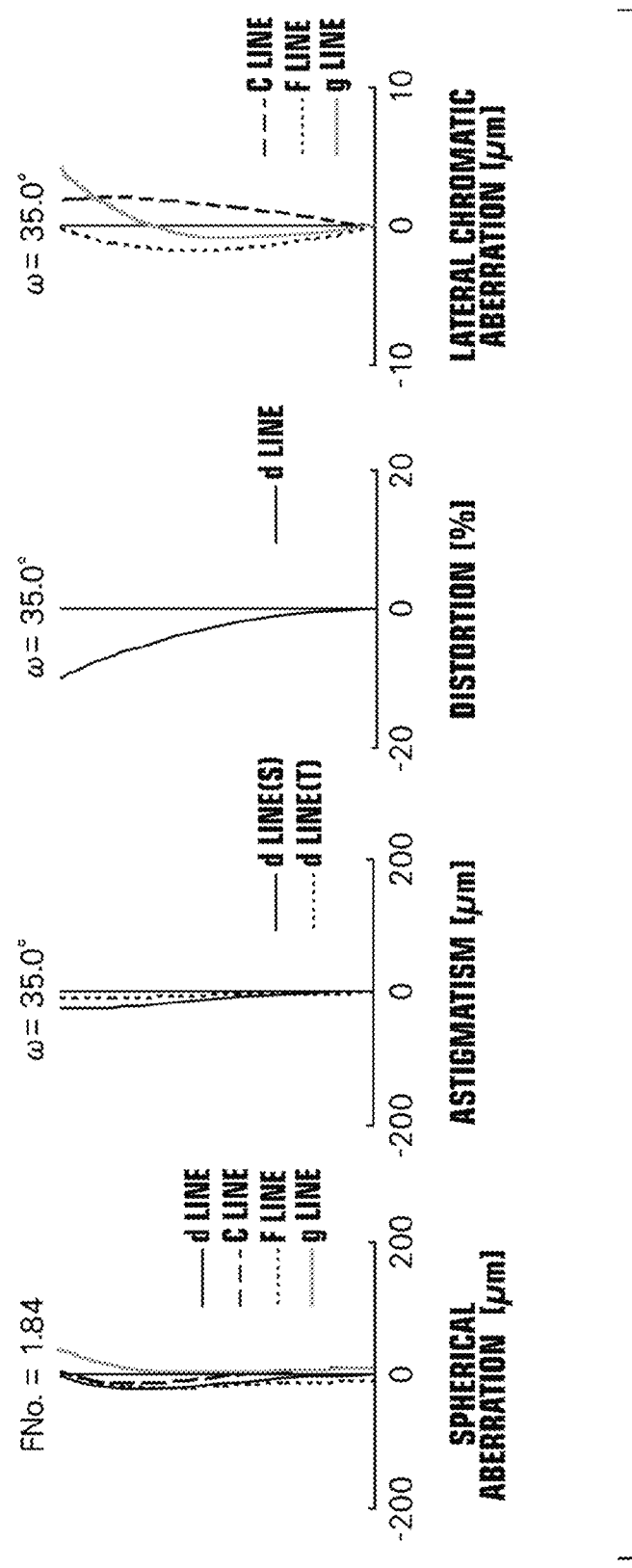
FIG. 8 is a collection of diagrams that illustrate various aberrations of the imaging lens of Example 2, wherein the diagrams are those that illustrate spherical aberration, astigmatism, distortion, and lateral chromatic aberration in order from the left side to the right side of the drawing sheet.

FIG. 2 illustrates the lens configuration of and the trajectories of light beams through an imaging lens according to Example 2. The numbers of lenses that constitute each of the lens groups of the imaging lens of Example 2 are the same as those of Example 1. Table 2 shows lens data for the imaging lens of Example 2. The spherical aberration, the astigmatism, the distortion, the lateral chromatic aberration (chromatic aberration of magnification rates) for a case in which the imaging lens of Example 2 is in a state focused on an object at infinity are illustrated in aberration diagrams in order from the left to the right of FIG. 8.

TABLE 2

Example 2
f = 6.096, Bf = 9.400, FNo. = 1.84, 2ω = 70.0°

| Si | Ri | Di | Ndj | Ndj |
|---|---|---|---|---|
| 1 | 23.80000 | 3.350 | 1.51633 | 64.14 |
| 2 | 65.88011 | 0.100 | | |
| 3 | 13.47998 | 3.197 | 1.79952 | 42.22 |
| 4 | 6.10830 | 3.032 | | |
| 5 | ∞ | 0.960 | 1.71299 | 53.87 |
| 6 | 6.64922 | 5.800 | | |
| 7 | 16.17559 | 3.713 | 1.79952 | 42.22 |
| 8 | −37.75092 | 5.040 | | |
| 9 (St) | ∞ | 2.288 | | |
| 10 | −47.89556 | 1.950 | 1.51633 | 64.14 |
| 11 | −13.40857 | 0.100 | | |
| 12 | 61.73728 | 2.982 | 1.49700 | 81.54 |
| 13 | −6.75381 | 0.700 | 1.76182 | 26.52 |
| 14 | −17.62890 | 0.100 | | |
| 15 | 13.40937 | 2.850 | 1.69680 | 55.53 |
| 16 | −28.16393 | 0.826 | 1.80000 | 29.84 |
| 17 | −327.48275 | 2.000 | | |
| 18 | ∞ | 0.800 | 1.51633 | 64.14 |
| 19 | ∞ | 6.991 | | |
| 20 (IMG) | ∞ | | | |

Example 3

Figure 3:
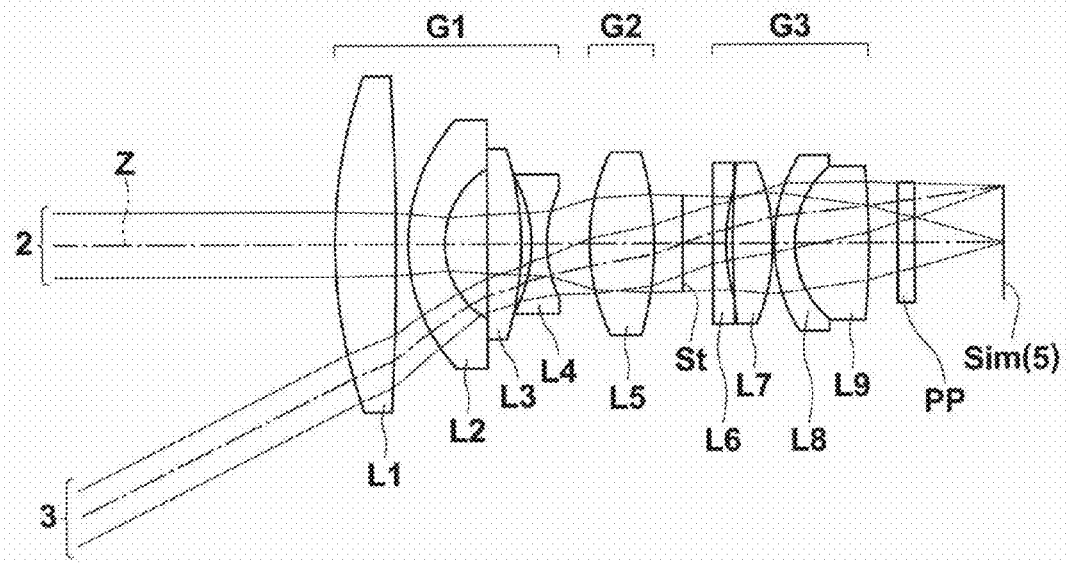
FIG. 3 is a sectional diagram that illustrates the lens configuration of and the trajectories of light beams through an imaging lens according to Example 3 of the present disclosure.
Figure 9:
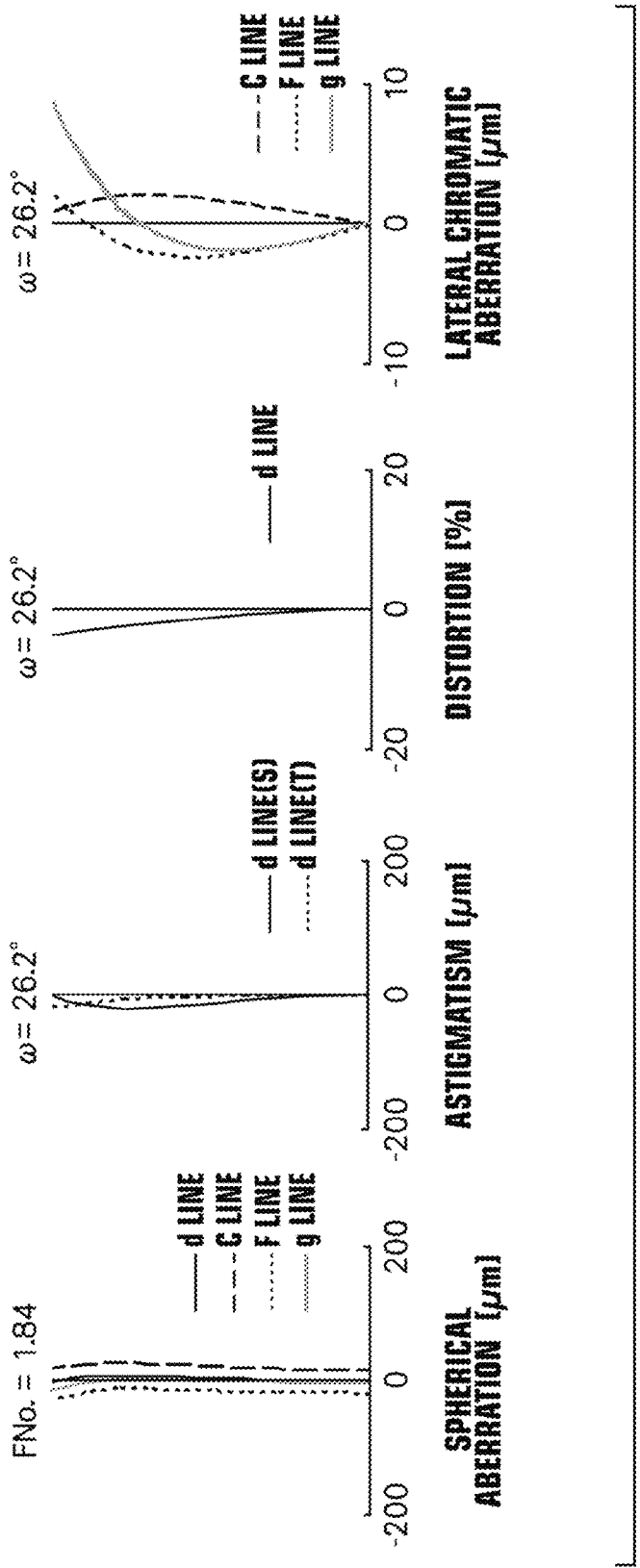
FIG. 9 is a collection of diagrams that illustrate various aberrations of the imaging lens of Example 3, wherein the diagrams are those that illustrate spherical aberration, astigmatism, distortion, and lateral chromatic aberration in order from the left side to the right side of the drawing sheet.

FIG. 3 illustrates the lens configuration of and the trajectories of light beams through an imaging lens according to Example 3. In the imaging lens of Example 3, the first lens group G1 consists of four lenses, which are, in order from the object side to the image side, lenses L1 through L4. The second lens group G2 consists only of a lens L5. The third lens group G3 consists of four lenses, which are, in order from the object side to the image side, lenses L6 through L9. Table 3 shows lens data for the imaging lens of Example 3. The spherical aberration, the astigmatism, the distortion, the lateral chromatic aberration (chromatic aberration of magnification rates) for a case in which the imaging lens of Example 3 is in a state focused on an object at infinity are illustrated in aberration diagrams in order from the left to the right of FIG. 9.

TABLE 3

Example 3
f = 8.118, Bf = 9.011, FNo. = 1.84, 2ω = 52.4°

| Si | Ri | Di | Ndj | Ndj |
|---|---|---|---|---|
| 1 | 33.57646 | 4.270 | 1.51633 | 64.14 |
| 2 | −190.77017 | 0.840 | | |
| 3 | 12.43047 | 2.560 | 1.71299 | 53.87 |
| 4 | 5.94744 | 2.970 | | |
| 5 | ∞ | 2.370 | 1.57099 | 50.80 |
| 6 | −20.98457 | 0.720 | | |
| 7 | −9.54939 | 1.070 | 1.51742 | 52.43 |
| 8 | 8.30132 | 2.990 | | |
| 9 | 14.16835 | 4.510 | 1.80100 | 34.97 |
| 10 | −21.86830 | 2.000 | | |
| 11 (St) | ∞ | 2.110 | | |
| 12 | ∞ | 0.930 | 1.92286 | 18.90 |
| 13 | 13.30361 | 0.450 | | |
| 14 | 58.57315 | 2.800 | 1.71299 | 53.87 |
| 15 | −13.82103 | 0.110 | | |
| 16 | 11.17695 | 1.430 | 1.74950 | 35.28 |
| 17 | 6.92500 | 5.180 | 1.71299 | 53.87 |
| 18 | −52.75248 | 2.000 | | |
| 19 | ∞ | 1.200 | 1.51633 | 64.14 |
| 20 | ∞ | 6.379 | | |
| 21 (IMG) | ∞ | | | |

Example 4

Figure 4:
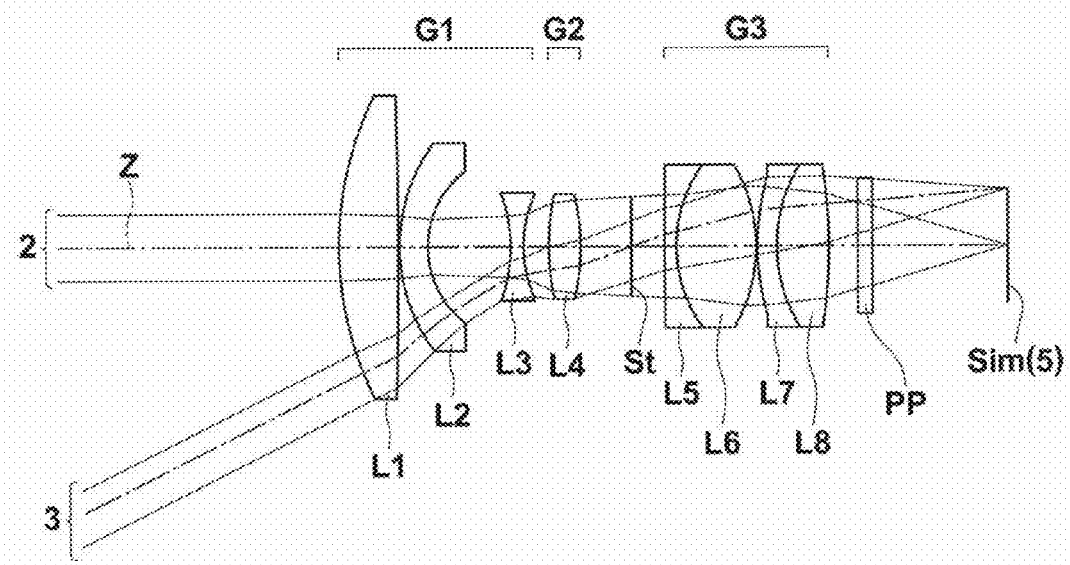
FIG. 4 is a sectional diagram that illustrates the lens configuration of and the trajectories of light beams through an imaging lens according to Example 4 of the present disclosure.
Figure 10:
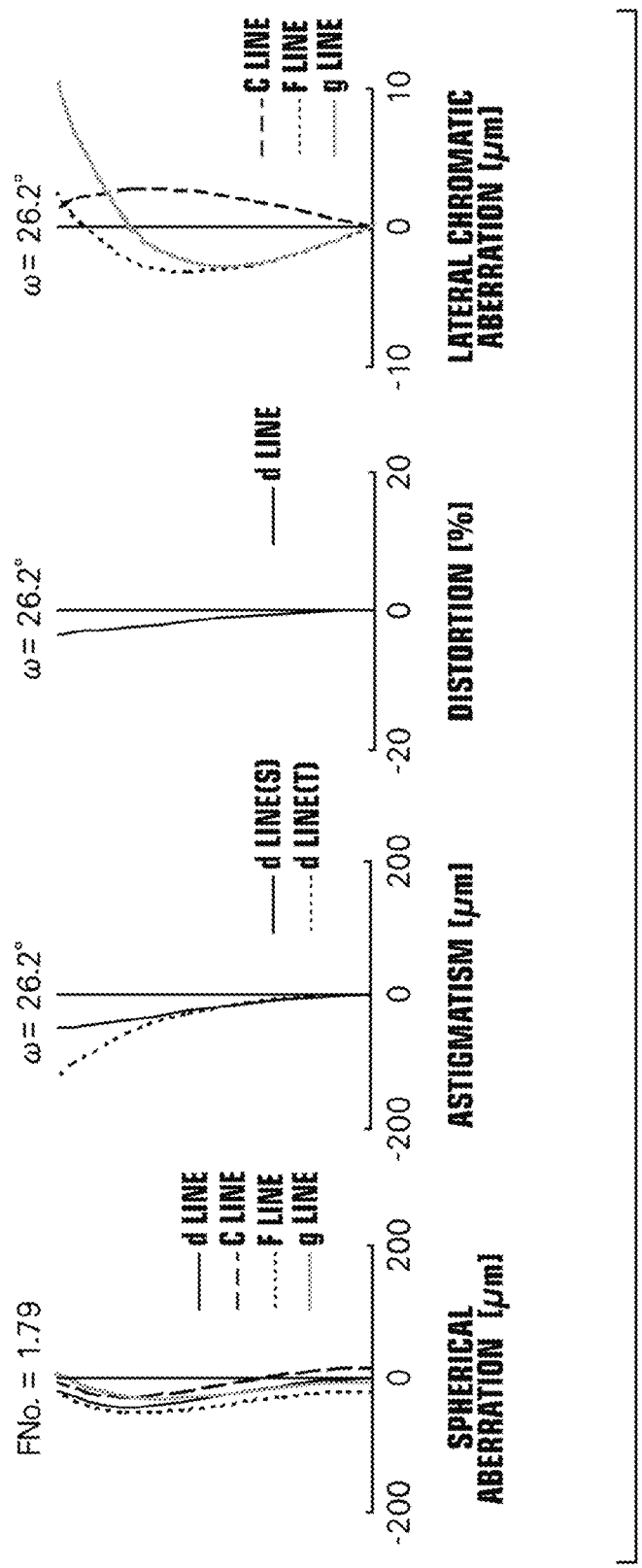
FIG. 10 is a collection of diagrams that illustrate various aberrations of the imaging lens of Example 4, wherein the diagrams are those that illustrate spherical aberration, astigmatism, distortion, and lateral chromatic aberration in order from the left side to the right side of the drawing sheet.

FIG. 4 illustrates the lens configuration of and the trajectories of light beams through an imaging lens according to Example 4. In the imaging lens of Example 4, the first lens group G1 consists of three lenses, which are, in order from the object side to the image side, lenses L1 through L3. The second lens group G2 consists only of a lens L4. The third lens group G3 consists of four lenses, which are, in order from the object side to the image side, lenses L5 through L8. Table 4 shows lens data for the imaging lens of Example 4. The spherical aberration, the astigmatism, the distortion, the lateral chromatic aberration (chromatic aberration of magnification rates) for a case in which the imaging lens of Example 4 is in a state focused on an object at infinity are illustrated in aberration diagrams in order from the left to the right of FIG. 10.

TABLE 4

Example 4
f = 8.100, Bf = 12.026, FNo. = 1.79, 2ω = 52.4°

| Si | Ri | Di | Ndj | vdj |
|---|---|---|---|---|
| 1 | 22.53355 | 4.100 | 1.51633 | 64.14 |
| 2 | −398.88753 | 0.100 | | |
| 3 | 11.56770 | 1.956 | 1.77250 | 49.60 |
| 4 | 6.40640 | 5.720 | | |

TABLE 4-continued

Example 4
f = 8.100, Bf = 12.026, FNo. = 1.79, 2ω = 52.4°

| Si | Ri | Di | Ndj | vdj |
|---|---|---|---|---|
| 5 | −10.64064 | 0.900 | 1.71299 | 53.87 |
| 6 | 8.22730 | 1.750 | | |
| 7 | 16.72135 | 2.200 | 1.85026 | 32.27 |
| 8 | −14.86287 | 3.526 | | |
| 9 (St) | ∞ | 2.300 | | |
| 10 | 288.84251 | 0.810 | 1.84666 | 23.78 |
| 11 | 9.23319 | 5.515 | 1.49700 | 81.54 |
| 12 | −10.69908 | 0.100 | | |
| 13 | 16.44566 | 1.336 | 1.80610 | 33.27 |
| 14 | 10.32690 | 3.600 | 1.77250 | 49.60 |
| 15 | −34.03477 | 2.000 | | |
| 16 | ∞ | 1.000 | 1.51633 | 64.14 |
| 17 | ∞ | 9.575 | | |
| 18 (IMG) | ∞ | | | 49.97 |

Example 5

Figure 11:
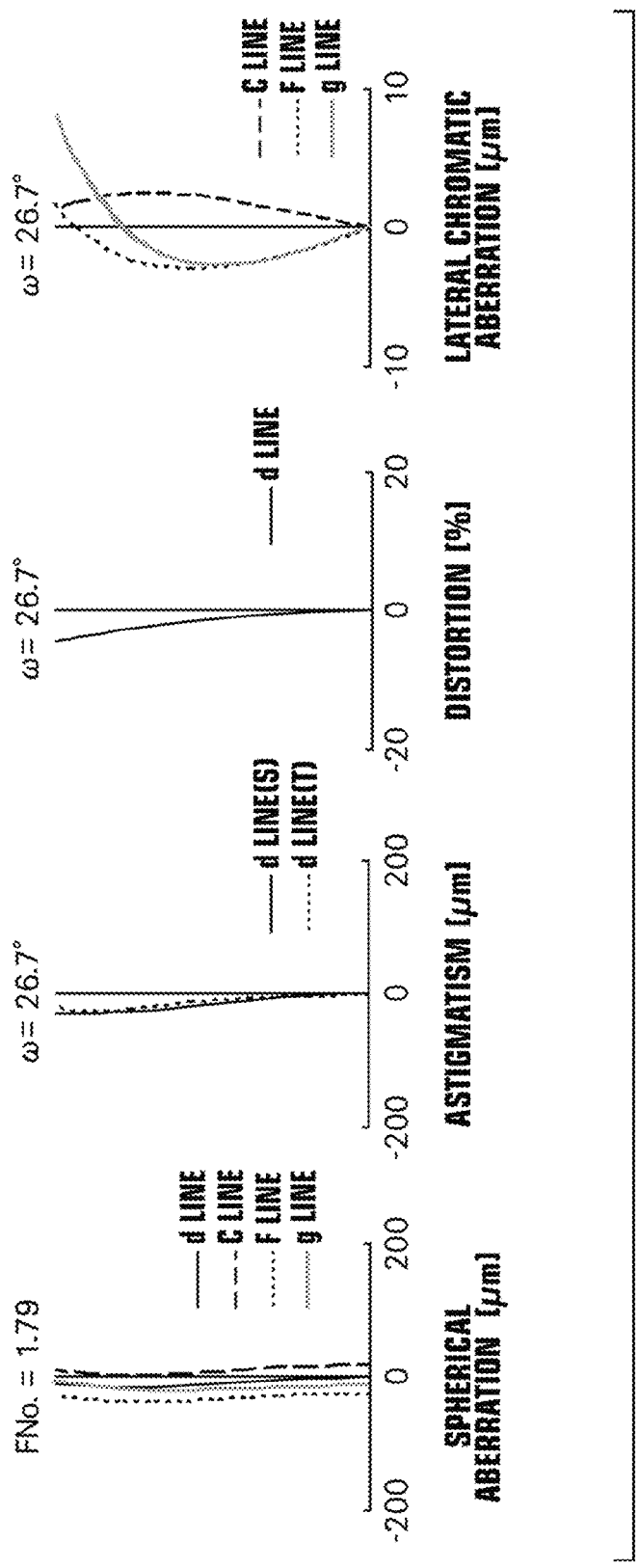
FIG. 11 is a collection of diagrams that illustrate various aberrations of the imaging lens of Example 5, wherein the diagrams are those that illustrate spherical aberration, astigmatism, distortion, and lateral chromatic aberration in order from the left side to the right side of the drawing sheet.

FIG. 5 illustrates the lens configuration of and the trajectories of light beams through an imaging lens according to Example 5. The numbers of lenses that constitute each of the lens groups of the imaging lens of Example 5 are the same as those of Example 4. Table 5 shows lens data for the imaging lens of Example 5. The spherical aberration, the astigmatism, the distortion, the lateral chromatic aberration (chromatic aberration of magnification rates) for a case in which the imaging lens of Example 5 is in a state focused on an object at infinity are illustrated in aberration diagrams in order from the left to the right of FIG. 11.

TABLE 5

Example 5
f = 8.120, Bf = 10.197, FNo. = 1.79, 2ω = 53.4°

| Si | Ri | Di | Ndj | vdj |
|---|---|---|---|---|
| 1 | 18.09618 | 3.963 | 1.51633 | 64.14 |
| 2 | −2569.92935 | 0.100 | | |
| 3 | 11.37414 | 1.250 | 1.77250 | 49.60 |
| 4 | 6.36149 | 3.909 | | |
| 5 | −13.19365 | 0.900 | 1.52249 | 59.83 |
| 6 | 7.15148 | 3.174 | | |
| 7 | 15.52479 | 2.000 | 1.80100 | 34.97 |
| 8 | −27.71125 | 5.036 | | |
| 9 (St) | ∞ | 2.200 | | |
| 10 | ∞ | 0.700 | 1.94595 | 17.98 |
| 11 | 15.86984 | 0.484 | | |
| 12 | 137.31856 | 2.600 | 1.71299 | 53.87 |
| 13 | −12.62498 | 0.100 | | |
| 14 | 12.98281 | 1.400 | 1.74950 | 35.28 |
| 15 | 8.58220 | 5.500 | 1.71299 | 53.87 |
| 16 | −27.25069 | 2.000 | | |
| 17 | ∞ | 1.000 | 1.51633 | 64.14 |
| 18 | ∞ | 7.748 | | |
| 19 (IMG) | ∞ | | | |

Example 6

Figure 12:
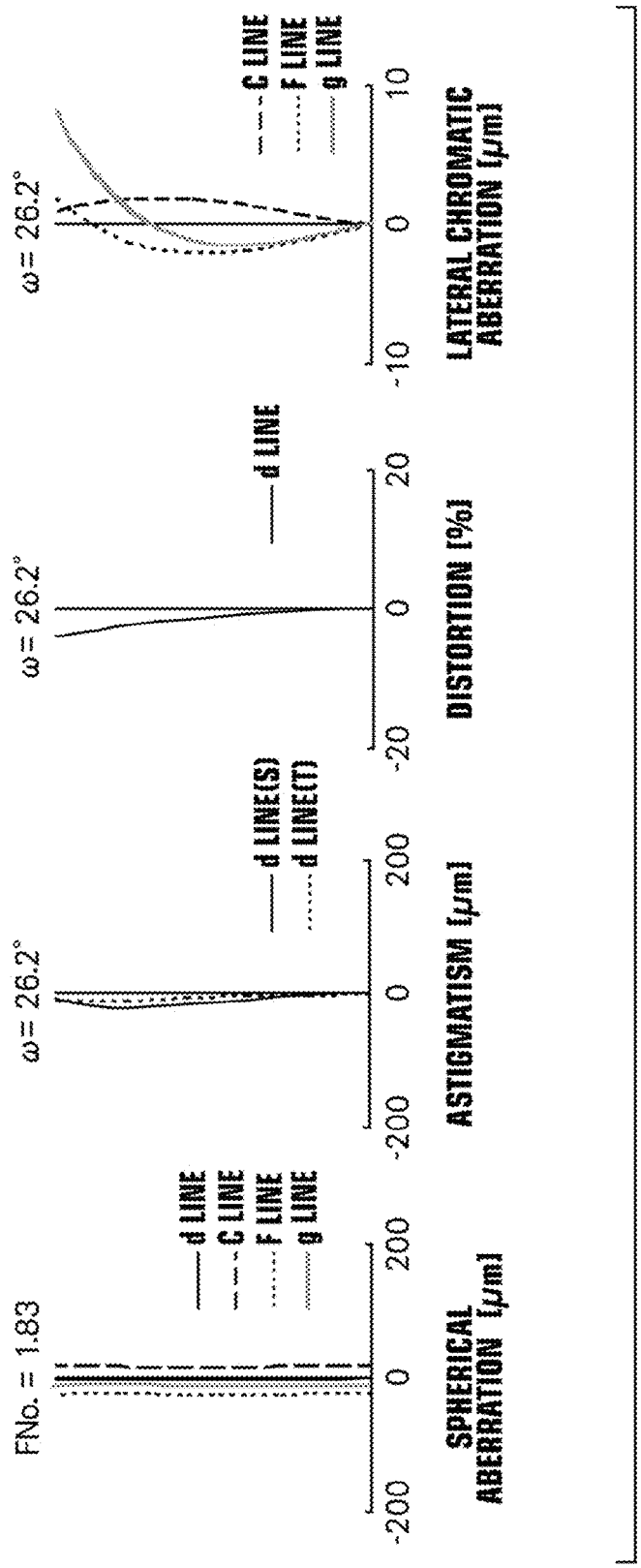
FIG. 12 is a collection of diagrams that illustrate various aberrations of the imaging lens of Example 6, wherein the diagrams are those that illustrate spherical aberration, astigmatism, distortion, and lateral chromatic aberration in order from the left side to the right side of the drawing sheet.

FIG. 6 illustrates the lens configuration of and the trajectories of light beams through an imaging lens according to Example 6. The numbers of lenses that constitute each of the lens groups of the imaging lens of Example 6 are the same as those of Example 3. Table 6 shows lens data for the imaging lens of Example 6. The spherical aberration, the astigmatism, the distortion, the lateral chromatic aberration (chromatic aberration of magnification rates) for a case in which the imaging lens of Example 6 is in a state focused on an object at infinity are illustrated in aberration diagrams in order from the left to the right of FIG. 12.

TABLE 6

Example 6
f = 8.119, Bf = 9.868, FNo. = 1.83, 2ω = 52.4°

| Si | Ri | Di | Ndj | vdj |
|---|---|---|---|---|
| 1 | 31.69961 | 3.701 | 1.51633 | 64.14 |
| 2 | −691.64231 | 0.785 | | |
| 3 | 12.46968 | 2.950 | 1.77250 | 49.60 |
| 4 | 6.16213 | 3.106 | | |
| 5 | ∞ | 2.206 | 1.51742 | 52.43 |
| 6 | −19.81483 | 0.820 | | |
| 7 | −10.37194 | 0.900 | 1.52249 | 59.83 |
| 8 | 7.86724 | 3.108 | | |
| 9 | 14.34888 | 4.350 | 1.80100 | 34.97 |
| 10 | −24.17972 | 2.309 | | |
| 11 (St) | ∞ | 2.010 | | |
| 12 | −218.56585 | 0.700 | 1.92286 | 18.90 |
| 13 | 13.93691 | 0.450 | | |
| 14 | 74.04006 | 2.600 | 1.71299 | 53.87 |
| 15 | −13.09259 | 0.100 | | |
| 16 | 11.82093 | 0.710 | 1.74950 | 35.28 |
| 17 | 7.82369 | 5.268 | 1.71299 | 53.87 |
| 18 | −35.86550 | 2.000 | | |
| 19 | ∞ | 0.800 | 1.51633 | 64.14 |
| 20 | ∞ | 7.550 | | |
| 21 (IMG) | ∞ | | | |

Table 7 shows values corresponding to Conditional Formulae (1) through (9) for the imaging lenses of Examples 1 through 6. The values shown in Table 7 use the d line as a reference.

TABLE 7

| Formula | | Example 1 | Example 2 | Example 3 | Example 4 | Example 5 | Example 6 |
|---|---|---|---|---|---|---|---|
| (1) | v12ave | 52.06 | 50.61 | 51.24 | 49.97 | 52.14 | 52.19 |
| (2) | f/f12 | −0.087 | −0.078 | 0.105 | −0.155 | −0.083 | 0.055 |
| (3) | Dth12/f | 3.232 | 3.306 | 1.823 | 2.883 | 2.861 | 1.782 |
| (4) | vd2 | 47.93 | 42.22 | 53.87 | 49.60 | 49.60 | 49.60 |
| (5) | f/f1 | −0.840 | −0.855 | −0.944 | −1.297 | −0.952 | −0.935 |
| (6) | Dbw12/f | 1.022 | 0.951 | 0.368 | 0.216 | 0.391 | 0.383 |

TABLE 7-continued

| Formula | | Example 1 | Example 2 | Example 3 | Example 4 | Example 5 | Example 6 |
|---|---|---|---|---|---|---|---|
| (7) | f/f3 | 0.520 | 0.535 | 0.669 | 0.732 | 0.730 | 0.687 |
| (8) | f/f2 | 0.393 | 0.417 | 0.714 | 0.847 | 0.640 | 0.686 |
| (9) | (R3 − R4)/(R3 + R4) | 0.409 | 0.376 | 0.353 | 0.287 | 0.283 | 0.339 |

As can be understood from the data above, the imaging lenses of Examples 1 through 6 consist of eight or nine lenses in the entire lens system, are configured to be compact, have small F numbers within a range from 1.7 to 1.85, correct various aberrations including chromatic aberrations from the center through the periphery of image formation regions, and realize high optical performance.

Figure 13:
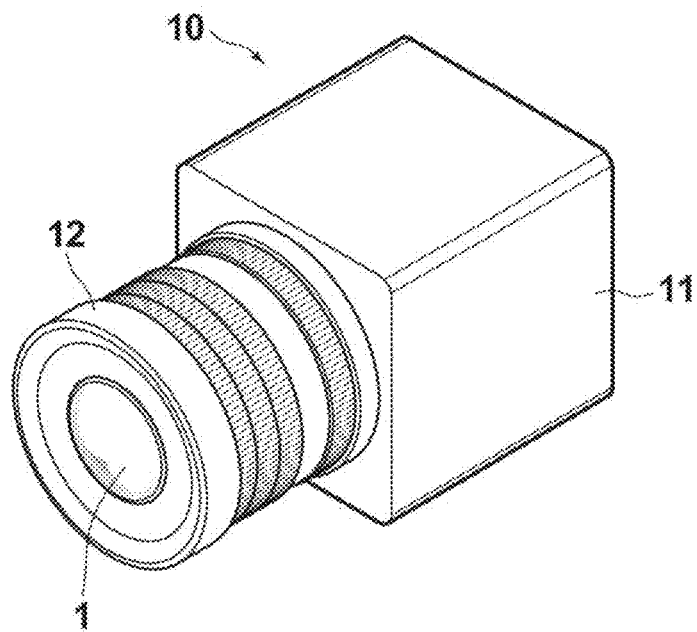
FIG. 13 is a perspective view of an imaging apparatus according to an embodiment of the present disclosure.

Next, an imaging apparatus according to an embodiment of the present disclosure will be described. A camera 10 illustrated in FIG. 13 is an imaging apparatus according to a first embodiment of the present disclosure. This camera 10 is a surveillance camera, which has a lens barrel 12 that contains an imaging lens 1 according to an embodiment of the present disclosure within a camera main body 11. An imaging element (not shown) is provided in the interior of the camera main body 11. The imaging element captures optical images formed by the imaging lens, and converts the optical images into electrical signals. A CCD (Charge Coupled Device) or a CMOS (Complementary Metal Oxide Semiconductor) may be employed as the imaging element, for example. Note that the imaging element is provided such that the optical axis Z of the imaging lens 1 passes through the center of the imaging element.

Figure 14A:
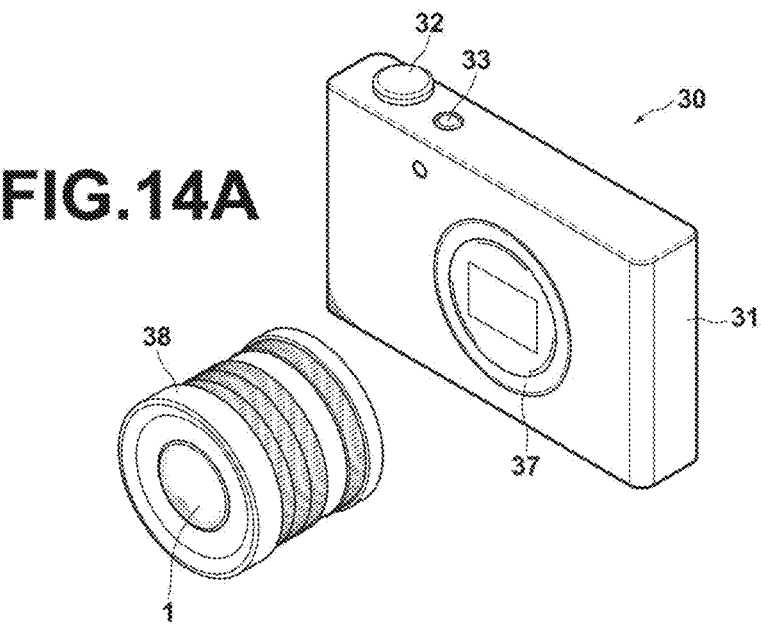
FIG. 14A is a perspective view that illustrates the front side of an imaging apparatus according to another embodiment of the present disclosure.
Figure 14B:
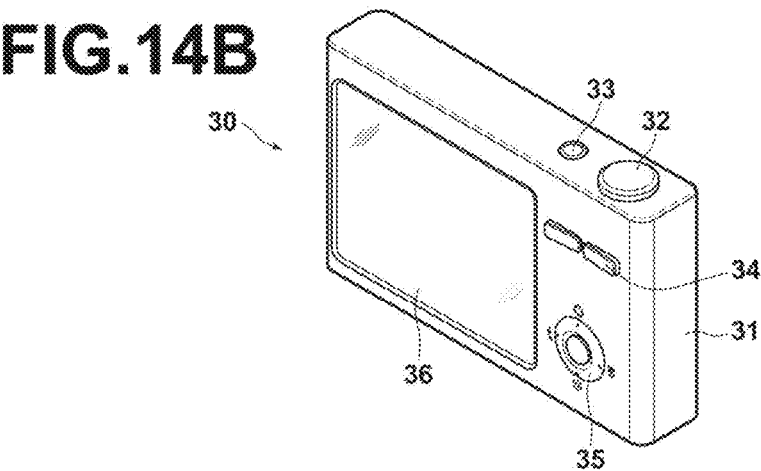
FIG. 14B is a perspective view that illustrates the rear side of an imaging apparatus according to the other embodiment of the present disclosure.

A camera 30 illustrated in FIG. 14A and FIG. 14B is an imaging apparatus according to an alternate embodiment of the present disclosure. FIG. 14A is a perspective view of the camera 30 as viewed from the front, and FIG. 14B is a perspective view of the camera 30 as viewed from the rear. The camera 30 is a non reflex type digital camera, which is configured such that an exchangeable lens 38 can be interchangeably mounted thereon. The exchangeable lens 38 is an imaging lens 1 according to an embodiment of the present disclosure housed in a lens barrel.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section 36 displays images which have been photographed and images within the angle of view prior to photography. A photography opening, in to which light from targets of photography enters, is provided at the central portion of the front surface of the camera body 31. A mount 37 is provided at a position corresponding to the photography opening. The exchangeable lens 38 is mounted onto the camera body 31 via the mount 37.

An imaging element (not shown), such as a CCD that outputs image signals corresponding to images of subjects formed by the exchangeable lens 38, a signal processing circuit that processes the image signals output by the imaging element to generate images, and a recording medium for recording the generated images, are provided within the camera body 31. In this camera 30, photography of a still image corresponding to a single frame or video imaging is enabled by pressing the shutter release button 32. Image data obtained by photography or video imaging are recorded in the recording medium.

The present disclosure has been described with reference to the embodiments and Examples thereof. However, the present disclosure is not limited to the embodiments and Examples described above, and various modifications are possible. For example, the values of the radii of curvature of each lens, the distances among surfaces, the refractive indices, the Abbe's numbers, etc., are not limited to the numerical values indicated in connection with the Examples, and may be other values.

In addition, a surveillance camera and a non reflex (so called mirrorless) digital camera were described as embodiments of the imaging apparatus. However, the imaging apparatus of the present disclosure is not limited to such cameras. The present disclosure may be applied to various other types of imaging apparatuses such as industrial cameras, single lens reflex cameras, film cameras, video cameras, cinematic cameras, and broadcast cameras as well.

What is claimed is:

1. An imaging lens consisting of, in order from the object side to the image side:
a first lens group having a negative refractive power;
a second lens group having a positive refractive power;
a stop; and
a third lens group having a positive refractive power,
the first lens group consisting of four lenses,
the first lens group having a positive lens and a negative meniscus lens provided adjacent to each other in this order as lenses most toward the object side, and further a negative lens as a lens most toward the image side,
the second lens group consisting of one single lens,
the third lens group consisting of four lenses,
the third lens group having four lenses having refractive powers of different signs adjacent to each other provided in order as lenses most toward the image side, and
conditional formulae (1) and (2) below being satisfied $$42 < v12\text{ave} < 60 \quad (1)$$

$$-0.3 < f/f12 < 0.2 \quad (2)$$

wherein v12ave is the average Abbe's number of all of the lenses within the first lens group and the second lens group with respect to the d line, f is the focal length of the entire lens system, and f12 is the combined focal length of the first lens group and the second lens group.

2. The imaging lens as defined in claim 1, wherein conditional formula (3) below is satisfied:

$$1 < D\text{th}12/f < 4.5 \quad (3)$$

wherein Dth12 is the distance along the optical axis from the surface most toward the object side within the first lens group to the surface most toward the image side within the second lens group.

3. The imaging lens as defined in claim 1, wherein conditional formula (4) below is satisfied:

$$35 < vd2 < 70 \quad (4)$$

wherein vd2 is the Abbe's number of the negative meniscus lens within the first lens group with respect to the d line.

4. The imaging lens as defined in claim 1, wherein conditional formula (5) below is satisfied:

$$-2 < f/f1 < -0.75 \qquad (5)$$

wherein f1 is the focal length of the first lens group.

5. The imaging lens as defined in claim 1, wherein conditional formula (6) below is satisfied:

$$0.15 < Dbw12/f < 1.5 \qquad (6)$$

wherein Dbw12 is the air distance along the optical axis between the first lens group and the second lens group.

6. The imaging lens as defined in claim 1, wherein conditional formula (7) below is satisfied:

$$0.4 < f/f3 < 1 \qquad (7)$$

wherein f3 is the focal length of the third lens group.

7. The imaging lens as defined in claim 1, wherein conditional formula (8) below is satisfied:

$$0.2 < f/f2 < 1 \qquad (8)$$

wherein f2 is the focal length of the second lens group.

8. The imaging lens as defined in claim 1, wherein conditional formula (9) below is satisfied:

$$0.15 < (R3-R4)/(R3+R4) < 0.6 \qquad (9)$$

wherein R3 is the radius of curvature of the surface toward the object side of the negative meniscus lens within the first lens group, and R4 is the radius of curvature of the surface toward the image side of the negative meniscus lens within the first lens group.

9. The imaging lens as defined in claim 1, wherein:
first lens group consists of, in order from the object side to the image side, the positive lens, the negative meniscus lens, and the negative lens.

10. The imaging lens as defined in claim 9, wherein:
the air distance along the optical axis between the first lens group and the second lens group is greater than the air distance along the optical axis between the negative meniscus lens within the first lens group and the negative lens within the first lens group.

11. The imaging lens as defined in claim 1, wherein:
the third lens group consists of, in order to from the object side to the image side, a positive lens, and the aforementioned four lenses.

12. The imaging lens as defined in claim 1, wherein:
the third lens group consists of the aforementioned four lenses.

13. The imaging lens as defined in claim 1, wherein:
the first lens group consists of, in order from the object side to the image side, the positive lens, the negative meniscus lens, a positive lens, and the negative lens.

14. The imaging lens as defined in claim 1, wherein conditional formula (1-1) below is satisfied:

$$46 < v12ave < 55 \qquad (1-1).$$

15. The imaging lens as defined in claim 1, wherein conditional formula (2-1) below is satisfied:

$$-0.2 < f/f12 < 0.15 \qquad (2-1).$$

16. The imaging lens as defined in claim 2, wherein conditional formula (3-1) below is satisfied:

$$1.5 < Dth12/f < 4 \qquad (3-1).$$

17. The imaging lens as defined in claim 3, wherein conditional formula (4-1) below is satisfied:

$$40 < vd2 < 60 \qquad (4-1).$$

18. The imaging lens as defined in claim 4, wherein conditional formula (5-1) below is satisfied:

$$-1.5 < f/f1 < -0.8 \qquad (5-1).$$

19. The imaging lens as defined in claim 5, wherein conditional formula (6-1) below is satisfied:

$$0.21 < Dbw12/f < 1.1 \qquad (6-1).$$

20. An imaging apparatus comprising the imaging lens as defined in claim 1.

21. An imaging lens consisting of, in order from the object side to the image side:
a first lens group having a negative refractive power;
a second lens group having a positive refractive power;
a stop; and
a third lens group having a positive refractive power,
the first lens group consisting of three lenses,
the first lens group having a positive lens and a negative meniscus lens provided adjacent to each other in this order as lenses most toward the object side, and further a negative lens as a lens most toward the image side,
the second lens group consisting of one single lens,
the third lens group consisting of five lenses,
four lenses of the third lens group having refractive powers of different signs adjacent to each other provided in order as lenses most toward the image side, and
conditional formulae (1) and (2) below being satisfied $$42 < v12ave < 60 \qquad (1)$$

$$-0.3 < f/f12 < 0.2 \qquad (2)$$

wherein v12ave is the average Abbe's number of all of the lenses within the first lens group and the second lens group with respect to the d line, f is the focal length of the entire lens system, and f12 is the combined focal length of the first lens group and the second lens group.

22. An imaging lens consisting of, in order from the object side to the image side:
a first lens group having a negative refractive power;
a second lens group having a positive refractive power;
a stop; and
a third lens group having a positive refractive power,
the first lens group consisting of three lenses,
the first lens group having a positive lens and a negative meniscus lens provided adjacent to each other in this order as lenses most toward the object side, and further a negative lens as a lens most toward the image side,
the second lens group consisting of one single lens,
the third lens group consisting of four lenses,
the third lens group having four lenses having refractive powers of different signs adjacent to each other provided in order as lenses most toward the image side, and
conditional formulae (1) and (2) below being satisfied $$42 < v12ave < 60 \qquad (1)$$

$$-0.3 < f/f12 < 0.2 \qquad (2)$$

wherein v12ave is the average Abbe's number of all of the lenses within the first lens group and the second lens group with respect to the d line, f is the focal length of the entire lens system, and f12 is the combined focal length of the first lens group and the second lens group.

* * * * *